United States Patent
Fielder et al.

(10) Patent No.: US 10,738,493 B2
(45) Date of Patent: Aug. 11, 2020

(54) SHEET MATERIAL

(71) Applicant: Plastipack Limited, Sussex (GB)

(72) Inventors: Timothy James Fielder, Surrey (GB);
Peter Anthony Adlington, Kent (GB);
Remi Wache, Greater London (GB);
Steven Kenneth Clowes, Surrey (GB);
Stephen Sweeney, Surrey (GB)

(73) Assignee: Plastipack Limited (GB)

( * ) Notice: Subject to any disclaimer, the term of this patent is extended or adjusted under 35 U.S.C. 154(b) by 297 days.

(21) Appl. No.: 15/580,954

(22) PCT Filed: Jun. 3, 2016

(86) PCT No.: PCT/GB2016/051643
§ 371 (c)(1),
(2) Date: Dec. 8, 2017

(87) PCT Pub. No.: WO2016/198840
PCT Pub. Date: Dec. 15, 2016

(65) Prior Publication Data
US 2018/0195301 A1    Jul. 12, 2018

(30) Foreign Application Priority Data

Jun. 8, 2015  (GB) .................... 1509903.9

(51) Int. Cl.
*E04H 4/10* (2006.01)
*B32B 27/08* (2006.01)
(Continued)

(52) U.S. Cl.
CPC ............... *E04H 4/10* (2013.01); *B32B 3/00* (2013.01); *B32B 27/08* (2013.01); *B32B 27/20* (2013.01);
(Continued)

(58) Field of Classification Search
CPC .. E04H 4/10; B32B 3/00; B32B 27/08; B32B 27/20; B32B 27/32; B32B 2264/101; B32B 2264/12; B32B 2307/304; B32B 2307/4026; B32B 2307/42; B32B 2323/046; B32B 2571/00; C08J 9/0061; C08J 9/32; C08J 2323/06; C08J 2323/08
(Continued)

(56) References Cited

U.S. PATENT DOCUMENTS 4,146,075 A   3/1979   Riedel
5,511,536 A   4/1996   Bussey, Jr.
(Continued)

FOREIGN PATENT DOCUMENTS

FR   2334708   7/1977
FR   2483583   12/1981
(Continued)

OTHER PUBLICATIONS

J. L. A. Francey and P. Golding; The Optical Characteristics of Swimming Pool Covers Used for Direct Solar Heating; Solar Energy; 1980; vol. 26; Pergamon Press Ltd; GB.
(Continued)

*Primary Examiner* — William K Cheung
(74) *Attorney, Agent, or Firm* — Heisler & Associates

(57) ABSTRACT

Sheet material, for example for a swimming pool cover 12, comprises an upper layer 14 of mid-IR absorbing material and a lower layer 16, with bubbles 18, which absorbs visible light. The material passes at least 25% of radiation in the near-IR region, thus promoting heating of the water while suppressing growth of algae. Inorganic particles are used to block visible radiation and pigments are used to block mid-IR radiation.

19 Claims, 1 Drawing Sheet

(51) Int. Cl.
*B32B 27/20* (2006.01)
*B32B 27/32* (2006.01)
*C08J 9/32* (2006.01)
*B32B 3/00* (2006.01)
*C08J 9/00* (2006.01)

(52) U.S. Cl.
CPC ............ *B32B 27/32* (2013.01); *C08J 9/0061* (2013.01); *C08J 9/32* (2013.01); *B32B 2264/101* (2013.01); *B32B 2264/12* (2013.01); *B32B 2307/302* (2013.01); *B32B 2307/304* (2013.01); *B32B 2307/4026* (2013.01); *B32B 2307/42* (2013.01); *B32B 2323/046* (2013.01); *B32B 2571/00* (2013.01); *C08J 2323/06* (2013.01); *C08J 2323/08* (2013.01); *C08J 2423/06* (2013.01); *C08J 2423/08* (2013.01)

(58) Field of Classification Search
USPC ......................................................... 526/348
See application file for complete search history.

(56) References Cited

U.S. PATENT DOCUMENTS

| | | | |
|---|---|---|---|
| 5,860,413 A | 1/1999 | Bussey, Jr. | |
| 6,047,415 A | 4/2000 | Brown | |
| 6,637,046 B2 | 10/2003 | Bartlett | |
| 2005/0125887 A1 | 6/2005 | Taylor | |
| 2005/0238885 A1 | 10/2005 | Takeda | |
| 2007/0290172 A1 | 12/2007 | Momose | |
| 2008/0008857 A1 | 1/2008 | Kalkanoglu | |
| 2008/0103267 A1 | 5/2008 | Hurst | |
| 2009/0207412 A1* | 8/2009 | Mahmood | A61B 5/0059 356/406 |
| 2009/0268278 A1 | 10/2009 | Suzuki | |
| 2009/0296202 A1 | 12/2009 | Wei | |
| 2010/0103507 A1 | 4/2010 | Imazawa | |

FOREIGN PATENT DOCUMENTS

| | | |
|---|---|---|
| GB | 2466340 | 6/2010 |
| JP | H07149086 | 6/1999 |
| WO | WO 2008/014597 | 2/2008 |
| WO | WO 2011/039520 | 4/2011 |

OTHER PUBLICATIONS

Katsumi Inada; Photo-Selective Plastic Film for Mulch; JARQ; 1973; pp. 252-256; vol. 7, No. 4; 1973.

\* cited by examiner

SHEET MATERIAL

This application is a national stage application under 35 USC 371 of International Application No. PCT/GB2016/051643, filed Jun. 3, 2016, which claims the priority of United Kingdom Application No. 1509903.9, filed Jun. 8, 2015, the entire contents of each of which are incorporated herein by reference.

The present invention relates to sheet material with selective optical properties and preferably for use in the manufacture of covers for swimming pools and other large holders of liquids. It particularly relates to material for a liquid covering which inhibits growth of algae while optimising heat gain and heat retention.

The use of removable covers for swimming pools and water storage has various advantages. Some of these are nearly independent from the cover type and quality, like the decrease of the water evaporation which is simply affected by covering the water with an impermeable material, or the contamination from debris responsible for higher filtration rates. On the other hand, among the advantages of a cover, two of them are highly dependent on its optical properties. Algae growth is a common problem in pool and water storage environments and it has been reported that an opaque cover limits this phenomenon by suppressing the visible light necessary for the photosynthesis to take place. Secondly the water temperature is also affected by the optical properties. While a transparent cover allows the solar radiation to directly penetrate the water and increase its temperature, an opaque cover will absorb the solar energy and transmit it to the water by a conduction process which is less effective due to the air insulation of the cover. Therefore there is currently a limitation of the covers, where they alternatively are transparent and promote the water heating process but are inefficient in preventing algae growth, or are opaque and reduce the chemical costs due to a limited algae growth but do not contribute to an optimal temperature increase or reduction of the heating costs.

A problem with some existing covers is shrinkage when they absorb heat. This is believed to be due to the tendency of the polymer material of the cover to crystallise under stress during the extrusion process caused by the pull on the manufacturing line. In opaque covers absorbing a lot of solar energy, the polymer chains in the material can gain enough molecular mobility to relieve the stress, which can lead to shrinkage of the covers when floating on water. This leads to dimensional instability and can lead to the cover no longer matching the extent of the body of water it is intended to cover.

Photosynthesis is a process involving visible light between 400 up to 720 nm. All photons in this range of wavelength are absorbed by the various pigments of plants including algae and transfer to the photosystems with photon energies corresponding to wavelengths of 680 and 720 nm. Photons with higher wavelengths are not used by the plants for the photosynthesis process.

Irradiation from the sun is wavelength dependent and different curves of the sun irradiation at the surface of the earth are well known. The energy spectral density of the sun has a maximum at around 500 nm in the visible light range, and 96% of the sun's energy is in the range 270 nm to 2600 nm. Only part of this range is used for photosynthesis, the other half constituting the near infrared region between 720 and 2600 nm.

The article "Photo-Selective Plastic Film for Mulch—JARQ Vol. 7, No. 4, 1973—Katsumi Inada" discloses a semi-opaque film which blocks the visible light used for photosynthesis but allows the passage of infrared wavelengths to raise soil temperature. This disclosure relates to the different technical field of promoting the growth and development of crop plants by raising soil temperature and controlling weed growth.

U.S. Pat. No. 6,637,046 discloses a swimming pool cover serving for just heat retention. An upper flat layer and a lower bubble layer may have different additives in each.

US 2005/0125887 discloses a similar cover which also serves to retard algae growth. The cover prevents the passage of specific bands of wavelengths of visible light which are required for growth of algae, the remaining wavelengths of light being allowed to pass through.

Plastic sheets and films and plastic compositions are also disclosed in FR 2334708 A1, JP H07149086A, US 2010/103507 A1 and WO 2008/014597A1.

Aspects of the invention seek to provide a sheet material which suppresses the growth of algae.

Aspects of the invention seek to provide a sheet material which promotes the heating of an underlying liquid.

Aspects of the invention seek to provide a sheet material which retains heat within an underlying liquid.

Aspects of the invention seek to provide a sheet material with improved dimensional stability, i.e. with a high resistance to shrinkage.

According to an aspect of the present invention there is provided sheet material which selectively transmits electromagnetic radiation passing radiation in the near-infrared region but transmiting substantially less radiation in a visible range adjacent to the near-infrared region and in a mid-infrared range adjacent to the near-infrared region.

The material preferably passes at least 25% of radiation in the near-infrared region and more preferably at least 30%.

The sheet material substantially does not transmit radiation in the visible range; preferably at least 90% and more preferably at least 98% is blocked. Absorption is the preferred process for blocking the radiation although some be reflected.

The material may reflect and/or absorb radiation in the mid-infrared range.

The material preferably transmits less than 20%, and more preferably less than 5%, of radiation in the mid-infrared range, at least up to 13000 nm.

The sheet material preferably comprises at least first and second layers, additives for preventing the transmission of radiation in the visible range being incorporated in the first layer and additives for preventing transmission of radiation in the mid-infrared range being incorporated in the second layer.

The first layer preferably comprises low density polyethylene and one or more pigments. One exemplary formulation for a 340 microns thick layer comprises a blend of low density polyethylene and low linear density polyethylene, 0 to 0.6 wt % of pigment yellow 181, 0 to 0.6 wt % of pigment red 122 and 0 to 1.2 wt % of pigment blue 15:3.

The second layer preferably comprises low density polyethylene and glass microspheres. One exemplary formulation for a 160 microns thick layer comprises a blend of low density polyethylene and low linear density polyethylene and 1 to 10 wt % and preferably 2 to 6 wt % of glass microspheres.

The first layer preferably has a thickness in the range 280 to 420 microns and the second layer preferably has a thickness in the range 120 to 200 microns. The concentrations of the respective formulations may be adjusted proportionally with the thickness of each material layer to produce the desired filtering effect.

The invention further provides a cover for the surface of a body of liquid comprising the above sheet material. In such a cover, the second layer is preferably the upper layer of the cover; an advantage of this arrangement is that the blocking of thermal radiations re-emitted by the liquid is more effective with the air gap between the second layer and the liquid. Also, in such a cover, the first layer is preferably the lower layer of the cover; an advantage of this arrangement is that it is more efficient for the energy from visible light to be absorbed closer to the liquid.

A preferred embodiment of the present invention will now be described, by way of example only, with reference to the accompanying drawings, of which:

BRIEF DESCRIPTION OF THE FIGURES

Referring to the drawings, FIG. 1 shows a cross-section through a swimming pool with a cover 12 of polyethylene sheeting material on its surface. The material comprises an upper, substantially flat, layer 14 and a lower layer 16 incorporating air-containing bubbles 18. The bubbles are arranged in an array, for example as disclosed in our international patent application WO 2011/039520.

Figure 1:
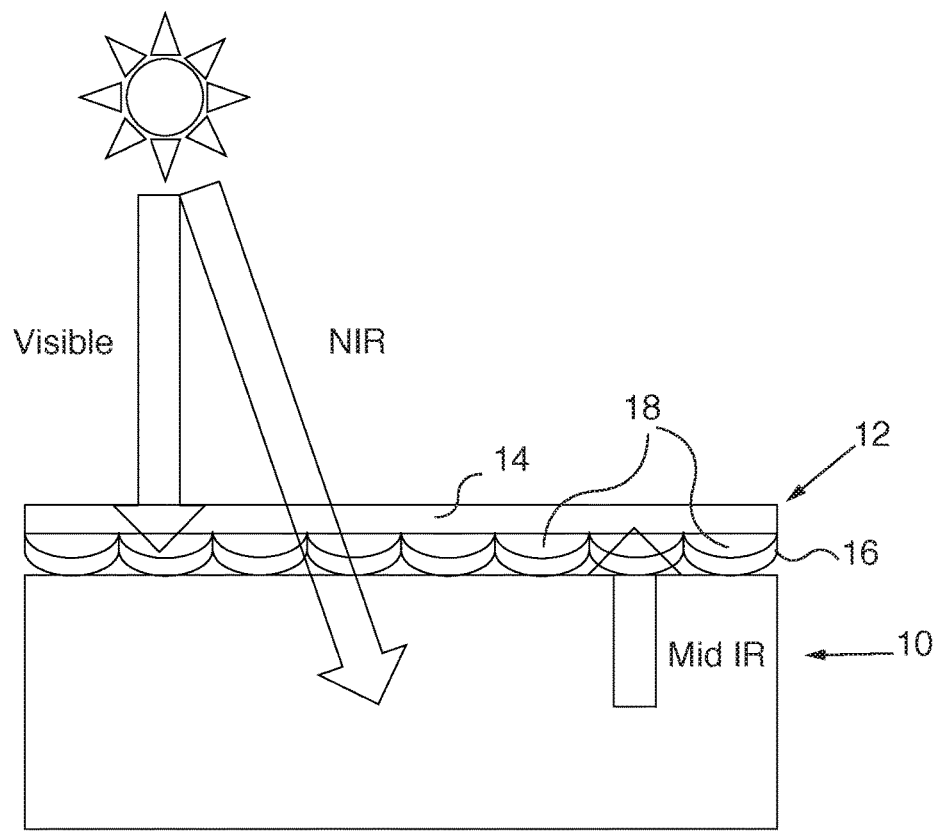
FIG. 1 is a schematic cross-sectional view of sheet material in accordance with an embodiment of the invention in use as a swimming pool cover.

The upper layer 14 is a mid-IR absorbing layer, typically containing a mixture of organic compounds and fillers blocking the wavelengths associated with heat loss. This feature which is similar to the greenhouse effect, is represented by the absorption curve L in FIG. 2.

Specific additives which absorb wavelengths in the 3000 to 20000 nm range, but are transparent to shorter wavelengths in the near-IR range, include organic molecules with specific bonds and preferably polymers which blend with the matrix. These include nitro compounds, halogen compounds, amines and nitriles compounds and more preferably alcohols, carboxylic acids, esters, ethers, ketones and aldehydes. These additives can be also particles or nanoparticles selected from one or more of silica, carbonates, sulphates, clays, kaolin, nepheline syenite, aluminosilicates, silicates, mica, mica coated flakes, quartz, hydroxides, indium tin oxide and antimony zinc oxide.

The additive, or one of the additives, may comprise particles, or nanoparticles, of a polymer presenting C—O, O—H, N—H, C—X, C—N or N—O bonds, or an organic molecule presenting C—O, O—H, N—H, C—X, C—N or N—O bonds.

The additive, or one of the additives may comprise ethylvinylacetate or butylvinylacetate, or copolymers thereof; these additives have good miscibility with polyethylene.

Heat absorbed by the layer 14 is returned to the pool 10 via conduction and re-emission of radiation.

Alternatively, or in addition, the layer 14 may incorporate one or more additives which cause direct reflection of radiation emerging from the pool back into the pool in the wavelength range 3000 to 20000 nm, while permitting transmission of solar radiation in the wavelength range 720 nm to 3000 nm.

An exemplary formulation of the upper layer 14 is a blend of low density polyethylene and low linear density polyethylene as a matrix and containing 3 wt % of glass microspheres, e.g. Spheriglass 7010 (Spheriglass is a Registered Trade Mark). The formulation further comprises additives depending on application and exposure such as stabilisers, such as UV stabilisers, in particular HALS (Hindered Amine Light Stabilisers), and/or absorbers. This exemplary formulation is set for a layer thickness of 160 microns and a total cover thickness of 500 microns. However, the exact concentration is preferably adjusted depending on the layer thicknesses and the presence of the various additives.

Both of the absorption and transmission effects of the upper layer are supplemented by the thermally insulating effect thereof.

The lower layer 16 is a visible light absorbing layer with one or more additives blocking visible light, thus preventing algae growth. The layer allows the passage therethrough of solar radiation in the near-infrared range. It also conducts into the water heat from the upper layer 14 and also any heat produced in itself by the light absorption process.

The additives in layer 16 are typically one or more of specific dyes, specific pigments, semiconductors, quantum dots and conductive polymers. More particular these may be selected from the group of perylene, anthraquinone, quinone, benzoamide, phthalocyanine, and azo pigments, or semiconductors such as, amorphous silicon, or conductive polymers such as polyaniline.

An exemplary formulation of the lower layer 16 is a blend of low density polyethylene and low linear density polyethylene as a matrix and containing 0.21 wt % of pigment yellow 181, 0.21 wt % of pigment red 122, 0.42 wt % of pigment blue 15:3. Again, stabilisers in the form of UV stabilisers, in particular HALS, and/or absorbers may be added depending on application and exposure. This exemplary formulation is set for a layer thickness of 340 microns and a total cover thickness of 500 microns. However, the exact concentration is preferably adjusted depending on the layer thicknesses and the presence of the various additives.

Since both of the layers 14, 16 pass near-IR wavelengths, the heat gain of the water is optimised and the temperature inside the covers remains relatively low so that problems associated with shrinkage are avoided.

Figure 2:
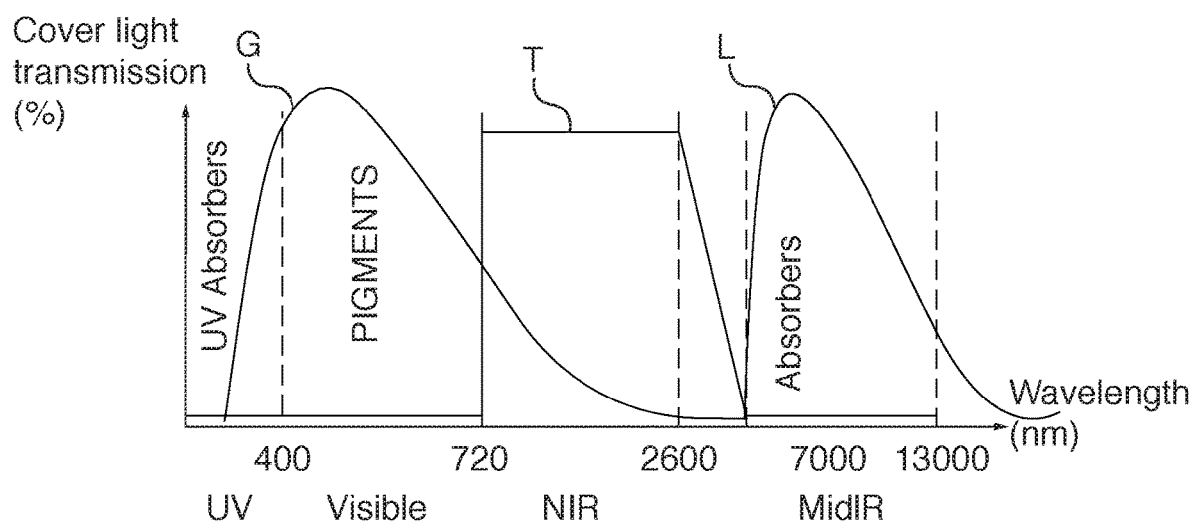
FIG. 2 is a graph of the optical transmission of the material of FIG. 1 plotted against wavelength.

FIG. 2 shows an idealised graph representing the optical light-transmissive behaviour T of the material 10. It will be appreciated that in practice the shapes of the performance curve of the material will vary to a certain extent as will the precise wavelength values at which changes begin and end. The spectrum of solar radiation representing the gain of the system is shown by curve G.

The boundaries between various bands of electromagnetic radiation are somewhat subjective. Referring to FIG. 2, the boundaries are as follows:

ultraviolet/visible—400 nm
visible/near infrared—720 nm
near infrared/mid-infrared—2600-7000 nm Alternatively the definition of the International Organisation for Standardisation for infrared ranges may be applied, namely:

near-infrared—780 to 3000 nm
mid-infrared—3000 to 5000 nm

Ultraviolet absorbers or scavengers are typically employed to reduce transmission in the UV range. They also serve to reduce polymer degradation due to the outside environment. The material is also substantially totally opaque in the visible range of 400 to 720 nm, although there may be a limited amount of transmission, say up to 20% in this range, and preferably no more than 5%.

The material is substantially transparent to near-infrared radiation, although other effects may reduce this to, say, a transmission of 25%, and preferably no less than 30%.

There follows a transition region between the near-infrared and mid-infrared ranges; typical end values of 2600 nm and 7000 nm are shown in the diagram although these may vary. The material is substantially totally opaque in the mid-IR range from 7000 nm to 13000 nm and beyond, although there may be a limited amount of transmission, say up to 20% in this region, and preferably no more than 15%. Losses of heat at wavelengths above 13000 nm are found to be relatively insignificant in practice.

The above-described material has numerous advantages. In particular it combines effective algae suppression with a significant degree of heat gain. Since both layers are transparent to near-IR radiation, there is a reduced absorption of heat by the cover itself (and a corresponding decrease of temperature inside the cover) when it is floating on or held above a body of water. This leads to a significant reduction in the amount of shrinkage over time compared to conventional covers.

Chemical treatment of swimming pools is time-consuming and expensive so the physical algae-reducing measures have the advantage of reducing or avoiding the need for chemical interventions to suppress algae.

An advantage of substantially blocking all of the visible range is that even visible light outside the wavelength bands blocked in US 2005/0125887 makes some contribution to growth of algae.

Various modifications may be made to the above-described embodiment. The cover 12 may be made of any suitable plastic material, typically a thermoplastic matrix e.g. a polyolefin material such as polyethylene or polypropylene. Other suitable types of thermoplastic materials may be used which are transparent in the near infrared such as polycarbonate, polymethylmethacrylate or polyvinylchloride materials. It may comprise a polymer blend, or a polymer composite or a nanocomposite.

The distribution of the additives may be interchanged between the two layers; alternatively some or all of the additives may be incorporated into the matrix material of each layer.

The cover may comprise two flat layers (like layer 14) or two bubble layers (like 16). It may comprise a single flat layer or a single bubble layer; in these modifications, of course, all the additives are in a single layer. Three or more plastic layers may be provided. The cover may be in the form of a tarpaulin or a foam.

The sheet material is suitable for swimming pools and spas, but may be used for other purposes, e.g. to cover ponds, water reservoirs or any other large body of water or other liquid. The cover may be totally or partially floating on the liquid and/or may be totally or partially suspended above the liquid level; in the latter case an enhanced greenhouse effect may be provided. The cover may comprise arrangements or additional parts for use as a safety cover.

The invention claimed is:

1. Sheet material which selectively transmits electromagnetic radiation, passing radiation in the near-infrared region but transmitting substantially less radiation in a visible range adjacent to near-infrared region and in a mid-infrared range adjacent to the near-infrared region; and
comprising a polymer, one or more first additives selectively blocking the visible radiations, and one or more second additives selectively blocking the mid infrared radiations.

2. Sheet material which selectively transmits electromagnetic radiation, passing radiation in the near-infrared region but transmitting substantially less radiation in a visible range adjacent to near-infrared region and in a mid-infrared range adjacent to the near-infrared region; and
said sheet material including a polymer, the polymer being polyethylene, the sheet material including one or more first additives which are inorganic particles and the sheet material including one or more second additives which are one or more pigments.

3. Sheet material according to claim 2 comprising low density polyethylene and glass microspheres.

4. Sheet material according to claim 3 comprising a blend of low density polyethylene and low linear density polyethylene, less than 10 wt % of glass microspheres, 0 to 1 wt % of pigment yellow, 0 to 1 wt % of pigment red and 0 to 2 wt % of pigment blue.

5. Sheet material according to claim 1 which passes at least 25% of radiation in the near-infrared region.

6. Sheet material according to claim 5 which passes at least 30% of radiation in the near-infrared region.

7. Sheet material according to claim 1 which substantially prevents transmission of radiation in the visible range.

8. Sheet material according to claim 1 which transmits less than 10% of radiation in the visible range.

9. Sheet material according to claim 8 which transmits less than 2% of radiation in the visible range.

10. Sheet material according to claim 1 which substantially prevents transmission of radiation in the mid-infrared range.

11. Sheet material according to claim 1, which transmits less than 20% of radiation in the mid-infrared range up to at least 13000 nm.

12. Sheet material according to claim 11 which transmits less than 15% of radiation in the mid-infrared range up to at least 13000 nm.

13. Sheet material which selectively transmits electromagnetic radiation, passing radiation in the near-infrared region but transmitting substantially less radiation in a visible range adjacent to near-infrared region and in a mid-infrared range adjacent to the near-infrared region; and
said sheet material comprising at least first and second layers, additives for preventing the transmission of radiation in the visible range being incorporated in the first layer and additives for preventing transmission of radiation in the mid-infrared range being incorporated in the second layer.

14. Sheet material according to claim 13, wherein the second layer incorporates air bubbles.

15. Sheet material according to claim 13 wherein the first layer comprises low density polyethylene and one or more pigments and the second layer comprises low density polyethylene and glass microspheres.

16. A cover for the surface of a body of liquid comprising a sheet of material according to claim 1.

17. A cover for the surface of a body of liquid comprising sheet material which selectively transmits electromagnetic radiation, passing radiation in the near-infrared region but transmitting substantially less radiation in a visible range adjacent to near-infrared region and in a mid-infrared range adjacent to the near-infrared region;
comprising at least first and second layers, additives for preventing the transmission of radiation in the visible range being incorporated in the first layer and additives for preventing transmission of radiation in the mid-infrared range being incorporated in the second layer; and
wherein the second layer is the upper layer of the cover.

18. A cover for the surface of a body of liquid comprising sheet material which selectively transmits electromagnetic radiation, passing radiation in the near-infrared region but transmitting substantially less radiation in a visible range adjacent to near-infrared region and in a mid-infrared range adjacent to the near-infrared region; and comprising at least first and second layers wherein the second layer incorporates bubbles.

19. A cover for the surface of a body of liquid comprising sheet material which selectively transmits electromagnetic radiation, passing radiation in the near-infrared region but transmitting substantially less radiation in a visible range adjacent to near-infrared region and in a mid-infrared range adjacent to the near-infrared region; and comprising at least first and second layers wherein the first layer comprises low density polyethylene and one or more pigments and the second layer comprises low density polyethylene and glass microspheres.

\* \* \* \* \*